United States Patent [19]
Horiuchi et al.

[11] Patent Number: 5,911,961
[45] Date of Patent: *Jun. 15, 1999

[54] CATALYST FOR PURIFICATION OF DIESEL ENGINE EXHAUST GAS

[75] Inventors: Makoto Horiuchi; Tomohiro Yokomizo, both of Hyogo, Japan

[73] Assignee: ICT Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/686,981

[22] Filed: Jul. 25, 1996

Related U.S. Application Data

[63] Continuation of application No. 08/349,790, Dec. 6, 1994, abandoned.

[51] Int. Cl.$^6$ ...................................................... B01J 8/02
[52] U.S. Cl. ...................... 423/213.5; 502/304; 502/313; 502/326; 502/328
[58] Field of Search ................... 423/213.5; 502/304, 502/313, 326, 328, 329

[56] References Cited

U.S. PATENT DOCUMENTS

| | | | |
|---|---|---|---|
| 5,116,800 | 5/1992 | Williamson et al. | 502/303 |
| 5,130,109 | 7/1992 | Wan | 423/213.2 |
| 5,157,007 | 10/1992 | Domesle et al. | 502/66 |
| 5,272,125 | 12/1993 | Weible et al. | 502/242 |
| 5,371,056 | 12/1994 | Leyrer et al. | 502/66 |
| 5,591,414 | 1/1997 | Jacob et al. | 422/180 |

FOREIGN PATENT DOCUMENTS

| | | |
|---|---|---|
| 0449423 | 2/1991 | European Pat. Off. . |
| 507590 | 7/1992 | European Pat. Off. . |
| 0622107 | 4/1994 | European Pat. Off. . |

OTHER PUBLICATIONS

European Search Repurt, May 16, 1995.
Japanese Patent Abstract: JP 59142851, vol. 8, No. 266, Aug. 1994.

*Primary Examiner*—Shrive Beck
*Assistant Examiner*—Timothy Meeks
*Attorney, Agent, or Firm*—Omri M. Behr, Esq.

[57] ABSTRACT

A catalyst for the purification of diesel engine exhaust gas is disclosed which excels in the ability to remove by combustion unburnt hydrocarbons and carbon monoxide as well as minute carbon particles in a wide temperature range from a low temperature zone upward. This catalyst for the purification of diesel engine exhaust gas comprises by having a three-dimensional structure coated with (A) a platinum and/or palladium-carrying refractory inorganic oxide powder obtained by depositing platinum and/or palladium and the catalytically active oxide of at least one metal selected from the group consisting of tungsten, antimony, molybdenum, nickel, vanadium, manganese, iron, bismuth, cobalt, zinc, and alkaline earth metals on (a) a first refractory inorganic oxide powder and (B) a catalyst composition formed of (b) a second refractory inorganic oxide powder and having the platinum and/or palladium contained therein in an amount in the range of from 5 to 50% by weight, based on the amount of (a) the first refractory inorganic oxide powder.

10 Claims, No Drawings

CATALYST FOR PURIFICATION OF DIESEL ENGINE EXHAUST GAS

This application is a continuation of application Ser. No. 08/349,790, filed Dec. 6, 1994, now abandoned.

BACKGROUND OF THE INVENTION

1. Field of the Invention

This invention relates to a catalyst for the purification of diesel engine exhaust gas.

2. Description of the Prior Art

In recent years, those fine particulates which are entrained particularly by diesel engine exhaust gas (which mainly comprise solid carbon particles, particles of sulfur type compounds such as sulfates, and liquid or solid macromolecular hydrocarbon particles and which will be hereinafter referred to collectively as "fine particulates") have been posing a serious problem before environment and hygiene. The reason for the problem is that these fine particulates very rarely have diameters not more than 1 μm and, therefore, are liable to be drifted in the air and inhaled into human bodies. Thus, measures are being pushed toward increasingly exacting regulations which concern the release of such fine particulates from diesel engines into the ambient air.

The trend of diesel engines toward use of increasingly high pressure for the injection of fuel and control of increasingly accurate timing of the injection of fuel has already decreased to a certain extent the amount of minute particulates discharged from diesel engines. This decrease, however, falls short of being fully satisfactory. The component of the fine particulates which mainly comprises liquid macromolecular hydrocarbons soluble in organic tractions (SOF) cannot be removed in spite of such improvements heretofore attained in diesel engines as mentioned above. These improvements have rather brought about an increase in the proportion of the SOF in the minute particulates. Since the SOF contains such harmful substances as cancerogenic substances, the removal of the SOF has become as important a task as the removal of fine particulates.

As respects means to remove minute particulates, studies are under way to establish the feasibility of a catalytic method which comprises seizing minute particulates from diesel engine exhaust gas by the use of a catalyst having a catalytic substance capable of effecting combustion of carbonaceous particles deposited on a three-dimensional refractory structure such as ceramic foam, wire mesh, metal foam, closed type ceramic honeycomb, open flow type ceramic honeycomb, or metal honeycomb and removing the seized carbon type particles by either utilizing such exhaust gas (with respect particularly to composition and temperature) as is freshly discharged from a diesel engine operated under the condition of normal travel or using such heating means as an electric heater.

Generally, the catalyst to be used for the purification of diesel engine exhaust gas is desired (a) to provide highly efficient removal by combustion of such harmful substances as unburnt hydrocarbons and carbon monoxide as well as carbonaceous type particles in a wide temperature range from a low temperature zone upward, (b) to possess only a meager ability to oxidize sulfur dioxide ($SO_2$) generated from the sulfur component contained richly in the gas oil used as the fuel into sulfur trioxide ($SO_3$) and repress the formation of sulfates (i.e. sulfur trioxide and sulfuric acid mist which result from the oxidation of sulfur dioxide), and (c) to abound in the so-called high-temperature durability, namely the ability to tolerate continuous operation under high load.

Various proposals have been heretofore made which are aimed at effecting the removal by combustion of carbonaceous particles with exalted efficiency. For example, as platinum group element-containing catalysts, JP-A-55-24,597 discloses a rhodium (7.5%)-platinum alloy, a platinum/palladium (50/50) mixture, a composite having palladium deposited on tantalum oxide or cerium oxide, and a mixture of palladium with not more than 75% by weight of platinum. They are claimed to be effective in catalyzing also the removal of SOF.

JP-A-61-129,030, JP-A-61-149,222, and JP-A-61-146,314 disclose such catalyst compositions which use palladium and rhodium as main active components and additionally incorporate therein alkali metals, alkaline earth metals, copper, lanthanum, zinc, and manganese. JP-A-59-82,944 discloses such a catalyst composition as combines at least one member selected from the group consisting of copper, alkali metals, molybdenum, and vanadium with at least one member selected from the group consisting of platinum, rhodium, and palladium.

Besides, an open type honeycomb-shaped noble metal oxide catalyst having through holes formed therein parallelly to the flow of gas has been reported (SAE Paper, 810263) as a catalyst for the removal of SOF from the diesel engine exhaust gas.

Indeed, the conventional catalysts mentioned above are invariably effective to a certain extent in removing by combustion the carbonaceous particles and in removing SOF. They, however, are highly effective in oxidizing sulfur dioxide and therefore are at a disadvantage in increasing the amount of sulfates to be formed, rather degrading the efficiency of the removal of minute particulates as a whole, and consequently suffering the sulfates to cause a new problem of environmental pollution.

A catalyst which possesses the aforementioned properties of (a) to (c) required of a catalyst used for the purification of diesel engine exhaust gas and manifests an ability to effect ample removal of the SOF remains yet to be developed.

A primary object of this invention, therefore, is to provide a catalyst for the purification of diesel engine exhaust gas which is capable of efficiently removing minute particulates entrained by the diesel engine exhaust gas.

Another object of this invention is to provide a catalyst for the purification of diesel engine exhaust gas which possesses an ability to remove by combustion such harmful substances as unburnt hydrocarbons and carbon monoxide as well as carbon type particles in the diesel engine exhaust gas in a wide temperature range from a low temperature zone upward, exhibits only a low capacity for oxidizing sulfur dioxide, and represses the formation of sulfates.

Yet another object of this invention is to provide a catalyst for the purification of diesel engine exhaust gas which is capable of removing the SOF in the diesel engine exhaust gas with high efficiency.

Still another object of this invention is to provide a catalyst for the purification of diesel engine exhaust gas which is excellent in high-temperature durability and, therefore, can be effectively incorporated in a diesel car without entailing any problem from the practical point of view.

SUMMARY OF THE INVENTION

The objects indicated above are accomplished by a catalyst for the purification of diesel engine exhaust gas, which comprises having a three-dimensional structure coated with (A) a platinum and/or palladium-carrying refractory inorganic oxide powder obtained by depositing platinum and/or palladium and the oxide of at least one metal selected from the group consisting of tungsten, antimony, molybdenum, nickel, vanadium, manganese, iron, bismuth, cobalt, zinc, and alkaline earth metals on (a) a first refractory inorganic oxide powder and (B) a catalyst composition formed of (b) a second refractory inorganic oxide powder and having the platinum and/or palladium contained therein in an amount in the range of from 5 to 50% by weight, based on the amount of (a) the first refractory inorganic oxide powder.

This invention further concerns the catalyst mentioned above, wherein the platinum and/or palladium-carrying refractory inorganic acid powder has a platinum and/or palladium content in the range of from 0.01 to 3 g, a catalytically active oxide content in the range of from 0.01 to 4 g, and (a) a first refractory inorganic oxide powder content in the range of from 0.01 to 25 g, per liter of the refractory three-dimensional structure.

This invention further concerns the catalyst mentioned above, wherein the platinum and/or palladium-carrying refractory inorganic oxide is used in an amount in the range of from 0.01 to 50% by weight, based on the catalyst composition.

This invention further concerns the catalyst mentioned above, wherein the platinum and/or palladium-carrying refractory inorganic acid powder has a platinum and/or palladium content in the range of from 0.1 to 2 g, a catalytically active oxide content in the range of from 0.01 to 2 g, and (a) a first refractory inorganic oxide powder content in the range of from 0.2 to 10 g, per liter of the refractory three-dimensional structure.

This invention further concerns the catalyst mentioned above, wherein the amount of platinum and/or palladium is in the range of from 10 to 50% by weight based on the amount of (1) the first refractory inorganic oxide powder.

This invention further concerns the catalyst mentioned above, wherein the first and the second refractory inorganic oxide are powders having a primary average particle diameter in the range of from 50 to 3,000 Angstroms.

This invention further concerns the catalyst mentioned above, wherein the powders have a BET (Brunaer-Emmett-Teller) surface area in the range of from 1 to 200 $m^2/g$.

This invention further concerns the catalyst mentioned above, wherein the amount of the catalyst composition to be deposited is in the range of from 0.1 to 200 g per liter of the refractory three-dimensional structure.

This invention further concerns the catalyst mentioned above, wherein the layer having the catalyst composition deposited thereon is coated with a rhodium-carrying refractory inorganic oxide powder having 0.01 to 0.5 g of rhodium deposited on (c) a third refractory inorganic oxide powder per liter of the structure.

This invention further concerns the catalyst mentioned above, wherein the amount of the rhodium-carrying refractory inorganic oxide powder is in the range of from 0.01 to 50 g per liter of the three-dimensional structure.

The catalyst of this invention can repress the formation of sulfates because it possesses an excellent capacity for removing by combustion such harmful substances as unburnt hydrocarbons and carbon monoxide as well as carbonaceous type particles in a wide temperature range from a low temperature zone upward and manifests only a meager ability to oxide sulfur dioxide. The catalyst of this invention, therefore, ideally fulfills the task of eliminating minute particulates in the diesel engine exhaust gas. By the use of the catalyst of this invention, the diesel engine exhaust gas can be purified with high efficiency.

Further, since the catalyst of this invention possesses an excellent ability to remove the SOF, it provides highly effective purification of the diesel engine exhaust gas.

Since the catalyst of this invention further excels in high-temperature durability, it can be effectively incorporated in a diesel car without entailing any problem from the practical point of view.

As described above, the catalyst of this invention is highly useful for the purification of diesel engine exhaust gas.

Explanation of the Preferred Embodiment

Now, this invention will be explained specifically below. In this invention, first a platinum and/or palladium-carrying refractory inorganic oxide powder is obtained by depositing platinum and/or palladium in conjunction with the oxide of at least one metal selected from the group consisting of tungsten, antimony, molybdenum, nickel, vanadium, manganese, iron, bismuth, cobalt, zinc, and alkaline earth metals on (a) a first refractory inorganic oxide.

The amount of platinum and/or palladium to be deposited is preferable to be in the range of from 0.01 to 3 g, more preferably from 0.1 to 2 g, per liter of the three-dimensional structure. If this amount is less than 0.01 g, the produced catalyst will be at a disadvantage in conspicuously degrading the ability to oxide such harmful components as the SOF in a wide temperature range from a low temperature zone upward. Conversely, if this amount exceeds 3 g, the excess will produce no proportionate increase in the improvement in the ability of oxidation and will turn out to be only economic loss.

The amount of (a) the platinum and/or palladium-carrying refractory inorganic oxide powder is desired to be in the range of from 0.01 to 25 g, preferably from 0.2 to 10 g, per liter of the three-dimensional structure. If this amount is less than 0.02 g, the platinum and/or palladium will be deposited with poor stability. If the amount exceeds 25 g, the deposition of platinum and/or palladium at an increased concentration will no longer show any effect in improving the ability of oxidation.

The oxide of at least one metal selected from the group consisting of tungsten, antimony, molybdenum, nickel, vanadium, manganese, iron, bismuth, cobalt, zinc, and alkaline earth metals is deposited in conjunction with platinum and/or palladium as described above on the first refractory inorganic oxide. The amount of the metal oxide to be deposited is preferable to be in the range of from 0.01 to 4 g, more preferably from 0.1 to 2 g, per liter of the three-dimensional structure. The amount of the metal oxide to be deposited is in the range of from 0.1 to 50% by weight, preferably from 5 to 50% by weight, based on the amount of (a) the first refractory inorganic oxide. The amount of platinum and/or palladium to be deposited is in the range of from 5 to 50% by weight, preferably from 10 to 50% by weight, based on the amount of (a) the first refractory inorganic oxide.

In accordance with this invention, by having the metal oxide deposited in conjunction with platinum and/or palladium on the powder of (a) the first refractory inorganic oxide, the metal oxide is allowed to be deposited in the vicinity of platinum and/or palladium and the use of the metal oxide in a small amount suffices to repress the formation of sulfates effectively.

The platinum and/or palladium-carrying refractory inorganic oxide powder is made to incorporate therein a second refractory inorganic oxide powder to form a catalyst composition.

As the starting material for platinum in the preparation of the catalyst of this invention, such platinum compounds as platinic chloride, dinitro-diamino platinic acid, platinum tetramine chloride, and platinum sulfide complex salt can be used. As the starting material for palladium, such palladium compounds as palladium nitrate, palladium chloride, palladium tetramine chloride, and palladium sulfide complex salt can be used.

As (a) the first and (b) the second refractory inorganic oxide to be used in this invention, activated alumina, silica, titania, zirconia, silica-alumina, alumina-zirconia, alumina-titania, silica-titania, silica-zirconia, titania-zirconia, and zeolites can be adopted. Among other inorganic oxides mentioned above, titania and zirconia may be cited as ideal powdery materials possessing the effect of repressing the ability of platinum and/or palladium to oxide sulfur dioxide. The primary average particle diameter of the refractory inorganic oxide (hereinafter referred to as "average particle diameter") is in the range of from 50 to 3,000 Ångstroms, preferably from 500 to 2,000 Ångstroms. The BET surface area of the refractory inorganic oxide is in the range of from 1 to 200 m$^2$/g, preferably 5 to 100 m$^2$/g.

The mixing ratio of (a) the first refractory inorganic oxide powder to (b) the second refractory inorganic oxide powder [(a)/(b)] is preferable to be in the range of from 0.05 to 1. If this mixing ratio is less than 0.05, the automatic increase in the ratio of (b) the second refractory inorganic oxide to the total amount of the catalyst composition and the consequent degradation of the efficiency of contact of platinum and/or palladium with such harmful substances as the SOF will not merely impair notably the ability to oxide the harmful substances but also induce accumulation of the SOF surpassing the capacity of the catalyst for purification and entail aggravation of pressure loss when the catalyst is exposed for a long time to the atmosphere of low temperature as during the idling operation or induce rapid discharge of a large amount of the SOF when the temperature of the diesel engine is elevated during the operation at a high rotational rate under a high load. If the mixing ratio exceeds 1, the produced catalyst will be at a disadvantage in suffering platinum and/or palladium and the metal oxide to succumb to thermal deterioration and deterioration by poisoning particularly under the conditions of high-temperature durability.

The catalyst composition which is obtained by combining the platinum and/or palladium-carrying refractory inorganic oxide powder with (b) the second refractory inorganic oxide powder as described above is deposited on a refractory three-dimensional structure. The amount of the catalyst composition to be deposited is in the range of from 0.1 to 200 g, preferably from 0.1 to 100 g, per liter of the refractory three-dimensional structure.

The catalyst of this invention may optionally incorporate therein rhodium for the purpose of repressing the formation of sulfates. As respects the manner of deposition of rhodium, though the deposition is effectively obtained by superposing rhodium on the platinum and/or palladium-carrying refractory inorganic oxide powder, it is more effectively attained by coating the catalyst composition-carrying layer with a second layer, specifically a rhodium-carrying refractory inorganic oxide having rhodium deposited on (c) a third refractory inorganic oxide powder.

The amount of rhodium to be deposited is preferable to be in the range of from 0.01 to 0.5 g per liter of the three-dimensional structure. If this amount is less than 0.01 g, the produced catalyst will be at a disadvantage in attaining only slight improvement in the ability to repress the formation of sulfates. Conversely, if this amount exceeds 0.5 g, the excess will no longer bring about any proportional addition to the improvement in the ability to repress the formation of sulfates and will prove to be a mere economic loss.

The amount of the rhodium-carrying refractory inorganic oxide powder (c) to be deposited is preferable to be in the range of from 0.01 to 50 g, more preferably from 0.01 to 10 g, per liter of the three-dimensional structure. The amount of rhodium to be deposited on (c) the refractory inorganic oxide is in the range of from 0.1 to 50% by weight, based on the amount of (c) the refractory inorganic oxide.

As the starting material for rhodium in the preparation of the catalyst of this invention, such rhodium compounds as rhodium nitrate, rhodium chloride, hexamine rhodium chloride, and rhodium sulfide complex salt can be used.

Incidentally, (c) the third refractory inorganic oxide powder may be made of the same material as (a) the first and (b) the second refractory inorganic oxide.

As the refractory three-dimensional structure for use in this invention, such monolithic carriers as ceramic foam, open flow ceramic honeycomb, wall flow type honeycomb monolith, open flow metal honeycomb, metal foam, and metal mesh can be adopted. Particularly when the diesel engine exhaust gas contains not more than 100 mg of fine particulates per m$^3$ of the exhaust gas and the minute particulates have a SOF content of not less than 20%, the open flow type ceramic honeycomb or the metal honeycomb is used ideally.

As the material for the ceramic honeycomb carrier, cordierite, mullite, α-alumina, zirconia, titania, titanium phosphate, aluminum titanate, petalite, spondumene, alumina, and magnesium silicate are used particularly preferably. Among other materials cited above, cordierite proves to be particularly desirable. The metal honeycomb carrier that is formed in a one-piece structure made of such an oxidation-resistant refractory metal as stainless steel or a Fe-Cr-Al alloy is used particularly advantageously.

The catalyst is prepared by the following method, for example. First, a platinum and/or palladium-carrying refractory inorganic oxide powder having substantially uniformly dispersed therein platinum and/or palladium and the oxide of at least one metal selected from the group consisting of tungsten, antimony, molybdenum, nickel, vanadium, manganese, iron, bismuth, cobalt, zinc, and alkaline earth metals is obtained by mixing an aqueous solution containing prescribed amounts of platinum and/or palladium and a water-soluble salt or oxide of the at least one metal with (a) the first refractory inorganic oxide powder, drying the resultant wet mixture at a temperature in the range of from 80° to 250° C., preferably from 80° to 150° C., and then firing the dried mixture at a temperature in the range of from 300 to 850° C., preferably from 400° to 700° C. for a period in the range of from 0.5 to 3 hours.

Then, the catalyst aimed at is obtained by mixing the platinum and/or palladium-carrying refractory inorganic oxide powder with (b) the second refractory inorganic oxide powder, wet pulverizing the resultant mixture thereby forming a slurry, immersing the refractory three-dimensional structure in the catalyst composition, depriving the wet catalyst composition of excess slurry, drying the resultant wet mixture at a temperature in the range of from 80° to 250° C., preferably from 80° to 150° C., and calcining the dry mixture at a temperature in the range of from 300° to 850° C., preferably from 400° to 700° C. for a period in the range of from 0.5 to 3 hours.

Now, this invention will be described specifically below with reference to working examples.

EXAMPLE 1

In an aqueous platinic chloride solution containing 8.3 g of platinum, 133 g of titania powder having a specific surface area of 92 m$^2$/g was thoroughly stirred. Then, the resultant wet mixture was dried at 150° C. for two hours and further fired at 520° C. for two hours to obtain titania powder having platinum deposited as dispersed therein (average particle diameter 120 Ångstroms). Subsequently, 133.3 g of this powder and 1 kg of zirconia having a specific surface area of 83 m$^2$/g (average particle diameter 80 Ångstroms) were wet pulverized together to form a slurry. In the slurry thus obtained, a cylindrical honeycomb carrier of cordierite measuring 5.66 inches in diameter and 6.00 inches in length and containing about 400 open gas flow cells per square inch of the cross section was immersed. Then the wet carrier was deprived of excess slurry, dried at 150° C. for 2 hours, and further calcined at 500° C. for 1 hour to obtain a catalyst. The amounts of zirconia, titania, and platinum carried on the catalyst were 60 g, 8 g, and 0.5 g respectively per liter of the structure.

EXAMPLE 2

In an aqueous platinic chloride solution containing 10 g of platinum, 100 g of zirconia powder having a specific surface area of 83 m$^3$/g and 40 g of tungstic anhydride were thoroughly stirred. The resultant wet mixture was dried at 150° C. for 1.5 hours and further fired at 600° C. for 1 hour to obtain zirconia powder having platinum and tungsten oxide (WO$_3$) deposited as dispersed therein (average particle diameter 80 Ångstroms). Then, 150 g of this powder and 1 kg of titania having a specific surface area of 92 m$^2$/g (average particle diameter 120 Ångstroms) were wet pulverized together to form a slurry. In this slurry, a cylindrical honeycomb carrier of stainless steel measuring 5.66 inches in diameter and 6.0 inches in length and containing about 400 open gas flow cells per square inch of the cross section was immersed. Then, the wet carrier was deprived of excess slurry, dried at 150° C. for 2 hours, and further calcined at 600° C. for 2 hours to obtain a catalyst. The amounts of titania, zirconia, platinum, and tungsten oxide deposited in this catalyst were 50 g, 5.0 g, 0.5 g, and 2.0 g respectively per liter of the structure.

EXAMPLE 3

In an aqueous platinic chloride solution containing 10.0 g of platinum, 100 g of titania powder having a specific surface area of 10 m$^2$/g and 14.0 g of antimony tetraoxide were thoroughly stirred. Then, the resultant wet mixture was dried at 150° C. for 2 hours and further calcined at 450° C. for 2 hours, to obtain titania powder (average particle diameter 1500 Ångstroms) having platinum and antimony tetraoxide (Sb$_2$O$_4$) deposited as dispersed therein. Then, 124 g of this powder and 1 kg of zirconia having a specific surface area of 83 m$^2$/g were wet pulverized together to form a slurry. In this slurry, the same cordierite honeycomb carrier as used in Example 1 was immersed. Then, the wet carrier was deprived of excess slurry, dried at 150° C. for 2 hours, and further calcined at 450° C. for 1 hour to obtain a catalyst, The amounts of zirconia, titania, platinum, and antimony oxide deposited in this catalyst were 50 g, 5.0 g, 0.5 g, and 0.7 g respectively per liter of the structure.

EXAMPLE 4

A catalyst was obtained by faithfully repeating the procedure of Example 3 while using 34.3 g of antimony molybdate powder in the place of 14.0 g of antimony tetraoxide. The amounts of zirconia, titania, platinum, and molybdenum oxide (MoO3) deposited in the catalyst were 50 g, 5.0 g, 0.5 g, and 1.4 g respectively per liter of the structure.

EXAMPLE 5

In an aqueous solution prepared by dissolving dinitrodiamino platinum containing 10 g of platinum and 156.0 g of nickel nitrate in deionized water, 120 g of (a) titania powder having a specific surface area of 92 m$^2$/g was thoroughly stirred. The resultant mixture was dried at 150° C. for 3 hours and further calcined at 500° C. for 1 hour to obtain titania powder (average particle diameter 120 Ångstroms) having platinum and nickel oxide (NiO) deposited as dispersed therein. Then, 170 g of this powder and 1.4 kg of titania-alumina powder containing of 1 kg of (b) titania having a specific surface area of 10 m$^2$/g and 400 g of alumina having a specific surface area of 145 m$^2$/g were wet pulverized together to form a slurry. In this slurry, the same cordierite honeycomb carrier as used in Example 1 was immersed. The resultant wet carrier was deprived of excess slurry, dried at 150° C. for 2 hours, and further calcined at 500° C. for 1.5 hours to obtain a catalyst. The amounts of titania (b), alumina, titania (a), platinum, and nickel oxide deposited in this catalyst were 50 g, 20 g, 6 g, 0.5 g, and 2.0 g respectively per liter of the structure.

EXAMPLE 6

A slurry containing platinum, vanadium oxide-carrying titania, and titania-alumina was obtained by faithfully repeating the procedure of Example 5 while using in the place of 156 g of nickel nitrate a solution produced by keeping 10.3 g of ammonium metavanadate stirred in deionized water and gradually adding 12.3 g of nitric acid to the stirred mixture. In this slurry, a cylindrical ceramic foam of cordierite measuring 5.66 inches in diameter and 6 inches in length, containing about 12 cells per inch of ceramic backbone, and possessing a void ratio of 90% was immersed. The wet ceramic foam was deprived of excess slurry, dried at 150° C. for 2 hours, and further calcined at 500° C. for 1 hour to obtain a catalyst. The amounts of titania (b), alumina, titania (a), platinum, and vanadium oxide carried in this catalyst were 50 g, 20 g, 6 g, 0.5 g, and 0.4 g respectively per liter of the structure.

EXAMPLE 7

In an aqueous solution prepared by dissolving a solution of 62.5 g of bismuth nitrate in nitric acid and dinitrodiamino platinum containing 10 g of platinum in deionized water, 140 g of titania powder (a) having a specific surface area of 10 m$^2$/g was thoroughly stirred. The resultant wet mixture was dried at 150° C. for 3 hours and further calcined at 500° C. for 2 hours to obtain titania powder (average particle diameter 1500 Ångstroms) having platinum and bismuth oxide (Bi$_2$O$_3$) deposited as dispersed therein. Then, 180 g of this powder and 1 kg of titania-zirconia mixed powder consisting of 800 g of titania (b) having a specific surface area of 92 m$^2$/g and 200 g of zirconia powder having a specific surface area of 83$^2$/g were wet pulverized together to form a slurry. In this slurry, the same honeycomb carrier of stainless steel as used in Example 2 was immersed. The resultant wet carrier was deprived of excess slurry, dried at 150° C. for 2 hours, and further calcined at 500° C. for 1 hour to obtain a structure having titania-zirconia, titania (a), platinum, and bismuth oxide deposited therein.

Then, in an aqueous solution prepared by dissolving rhodium nitrate containing 6.0 g of rhodium in deionized water, 300 g of alumina powder having a specific surface area of 28 m$^2$/g was thoroughly stirred. The resultant wet mixture was dried at 150° C. for 3 hours and further calcined at 500° C. for 1 hour to obtain alumina powder (average particle diameter 300 Ångstroms) having rhodium deposited as dispersed therein. A slurry was obtained by wet pulverizing 303 g of this powder. In this slurry, the structure mentioned above was immersed. The wet structure was deprived of excess slurry, dried at 150° C. for 1 hour, and further calcined at 500° C. for 1 hour to obtain a catalyst. The amounts of titania (b), zirconia, titania (a), platinum, bismuth oxide, alumina, and rhodium deposited in the catalyst were 40 g, 10 g, 7.0 g, 0.5 g, 1.5 g, 5.0 g, and 0.1 g respectively per liter of the structure.

EXAMPLE 8

A catalyst was obtained by faithfully repeating the procedure of Example 7 while using a solution of 29.0 g of cobalt nitrate in deionized water in the place of 62.5 g of bismuth nitrate. The amounts of titania (b), zirconia, titania (a), platinum, cobalt oxide, alumina, and rhodium carried in this catalyst were 40 g, 10 g, 7.0 g, 0.5 g, 0.4 g, 5.0 g and 0.1 g respectively per liter of the structure.

EXAMPLE 9

In an aqueous solution prepared by dissolving palladium nitrate containing 40 g of palladium and 42.2 g of calcium nitrate in deionized water, 200 g of titania powder having a specific surface area of 54 m$^2$/g was thoroughly stirred. The resultant mixture was dried at 150° C. for 1 hour and further calcined at 500° C. for 1 hour to obtain titania powder (average particle diameter 200 Ångstroms) having palladium and calcium oxide (CaO) deposited as dispersed therein. Then, 250 g of this powder and 1 kg of zirconia powder having a specific surface area of 83 m$^2$/g were wet pulverized together to form a slurry. In this slurry, the same cordierite honeycomb carrier as used in Example 1 was immersed. The resultant wet carrier was deprived of excess slurry, dried at 150° C. for 2 hours, and further calcined at 500° C. for 1.5 hours to obtain a catalyst. The amounts of zirconia, titania, palladium, and calcium oxide carried in this catalyst were 50 g, 10 g, 2.0 g, and 0.5 g respectively per liter of the structure.

EXAMPLE 10

A catalyst was obtained by faithfully repeating the procedure of Example 9 while using a solution of 43.9 g of zinc nitrate in deionized water in the place of 42.2 g of calcium nitrate. The amounts of zirconia, titania, palladium, and zinc oxide deposited in this catalyst were 50 g, 10 g, 2.0 g, and 0.6 g respectively per liter of the structure.

EXAMPLE 11

A catalyst was obtained by faithfully repeating the procedure of Example 9 while using a solution of 206.8 g of magnesium nitrate in deionized water in the place of 42.2 g of calcium nitrate. The amounts of zirconia, titania, palladium, and magnesium oxide deposited in this catalyst were 50 g, 10 g, 2.0 g, and 1.3 g respectively per liter of the structure.

EXAMPLE 12

In an aqueous solution prepared by dissolving palladium chloride containing 30 g of palladium and 112.8 g of manganese acetate in deionized water, 100 g of (a) zirconia powder having a specific surface area of 52 m$^2$/g was thoroughly stirred. The resultant wet mixture was dried at 150° C. for 2 hours and further calcined at 550° C. for 1 hour to obtain zirconia powder (average particle diameter 170 Ångstroms) having palladium and manganese oxide (MnO$_2$) deposited as dispersed therein. Then, 170 g of this powder and 1 kg of titania-zirconia mixed powder containing of 200 g of titania powder having a specific surface area of 92 m$^2$/g and 800 g of (b) zirconia powder having a specific surface area of 83$^2$/g were wet pulverized together to form a slurry. In this slurry, the same cordierite honeycomb carrier as used in Example 1 was immersed. The resultant wet carrier was deprived of excess slurry, dried at 150° C. for 2 hours, and further calcined at 500° C. for 1.5 hours to obtain a catalyst. The amounts of titania, zirconia (b), zirconia (a), palladium, and manganese oxide deposited in this catalyst were 10 g, 40 g, 5 g, 1.5 g, and 2.0 g respectively per liter of the structure.

EXAMPLE 13

In an aqueous solution prepared by dissolving palladium nitrate containing 30 g of palladium and 182.2 g of iron nitrate in deionized water, 100 g of titania powder having a specific surface area of 10 m$^2$/g was thoroughly stirred. The resultant wet mixture was dried at 150° C. for 2.5 hours and further calcined at 500° C. for 1.5 hours to obtain a titania powder having palladium and iron oxide (Fe$_2$O$_3$) deposited as dispersed therein. Then, 166 of this powder and 1.2 kg of alumina-zirconia mixed powder containing 400 g of alumina powder having a specific surface area of 145 m$^2$/g and 800 g of zirconia powder having a specific surface area of 83 m$^2$/g were wet pulverized together to form a slurry. In this slurry, the same cordierite honeycomb carrier as used in Example 1 was immersed. The resultant wet carrier was deprived of excess slurry, dried at 150° C. for 1.5 hours, and further calcined at 500° C. for 3 hours to obtain a catalyst. The amounts of alumina, zirconia, titania, palladium, and iron oxide deposited in this catalyst were 20 g, 40 g, 5 g, 1.5 g, and 1.8 g respectively per liter of the structure.

Control 1

Zirconia powder having platinum deposited as dispersed therein was obtained by placing 1 kg of zirconia powder having a specific surface area of 83 m$^2$/g in an aqueous platinic chloride solution containing 16.6 g of platinum, thoroughly stirring them together, drying the resultant wet mixture at 150° C. for 2 hours, and further calcining the dry mixture at 500° C. for 2 hours. Then, 1 kg of this powder was wet pulverized to form a slurry. In this slurry, the same cordierite honeycomb carrier as used in Example 1 was immersed. The resultant wet carrier was deprived of excess slurry, dried at 150° C. for 2 hours, and further calcined at 500° C. for 1 hour to obtain a catalyst. The amounts of zirconia and platinum deposited in this catalyst were 60 g and 1.0 g respectively per liter of the structure.

Control 2

Titania powder having platinum and tungsten oxide (WO$_3$) deposited as dispersed therein was obtained by placing 1 kg of titania powder having a specific surface area of 92 m$^2$/g and 40 g of tungstic anhydride in an aqueous platinic chloride solution containing 10 g of platinum, thoroughly stirring them together, drying the resultant wet mixture at 150° C. for 1.5 hours, and further calcining the dry mixture at 600° C. for 1 hour. Then, 1 kg of this powder was wet pulverized to form a slurry. In this slurry, the same stainless steel honeycomb carrier as used in Example 2 was immersed. The resultant wet carrier was deprived of excess slurry, dried at 150° C. for 2 hours, and further calcined at 600° C. for 2 hours to obtain a catalyst. The amounts of titania, platinum, and tungsten oxide deposited in this catalyst were 50 g, 0.5 g, and 2.0 g respectively per liter of the structure.

Control 3

Titania powder having platinum and antimony oxide ($Sb_2O_4$) deposited as dispersed therein was obtained by placing 600 g of titania powder having a specific surface area of 10 $m^2/g$ and 14.0 g of antimony tetraoxide in an aqueous titanic chloride solution containing 10.0 g of platinum, thoroughly stirring them together, drying the resultant wet mixture at 150° C. for 2 hours, and further calcining the dry mixture at 450° C. for two hours. Then, 624 g of this powder and 500 g of zirconia having a specific surface area of 83 $m^2/g$ were wet pulverized together to form a slurry. In this slurry, the same cordierite honeycomb carrier as used in Example 1 was immersed. The resultant wet carrier was deprived of excess slurry, dried at 150° C. for 2 hours, and further calcined at 450° C. for 1 hour to obtain a catalyst. The amounts of zirconia, titania, platinum, and antimony oxide deposited in this catalyst were 25 g, 30 g, 0.5 g, and 0.7 g respectively per liter of the structure.

Control 4

A catalyst was obtained by faithfully repeating the procedure of Example 5 while using 389.3 g of nickel nitrate as dissolved in deionized water. The amounts of titania (b), alumina, titania (a), platinum, and nickel nitrate deposited in this catalyst were 50 g, 20 g, 6.0 g, 0.5 g, and 5.0 g respectively per liter of the structure.

Control 5

Zirconia powder having palladium deposited therein was obtained by placing 1 kg of zirconia powder having a specific surface area of 83 $m^3/g$ in an aqueous palladium nitrate solution containing 40 g of palladium, thoroughly stirring them together, drying the resultant wet mixture at 150° C. for 1 hour, and further calcining the dry mixture at 500° C. for 1 hour. Then, 1 kg of this powder was wet pulverized to form a slurry. In this slurry, the same cordierite honeycomb carrier as used in Example 1 was immersed. Then, the resultant wet carrier was deprived of excess slurry, dried at 150° C. for 2 hours, and further calcined at 500° C. for 1.5 hours to obtain a catalyst. The amounts of zirconia and palladium deposited in this catalyst were 50 g and 2.0 g respectively per liter of the structure.

The amounts of the components deposited in the catalysts obtained in Examples 1 to 13 and Controls 1 to 5 are shown in Table 1.

TABLE 1

| | Platinum and/or palladium-carrying refractory inorganic oxide | | | | Component | | |
|---|---|---|---|---|---|---|---|
| | Platinum and/or palladium (g/liter of carrier) | Added component (g/liter of carrier) | Refractory inorganic oxide(a) (g/liter of carrier) | | Refractory inorganic oxide(b) (g/liter of carrier) | | carried as second layer (g/liter of carrier) | Type of three-dimensional structure (Evaluation of catalyst) |
| Example 1 | Pt 0.5 | | $TiO_2$ | 8.0 | $ZrO_2$ | 60 | | ceramic honeycomb |
| Example 2 | Pt 0.5 | $WO_3$ 2.0 | $ZrO_2$ | 5.0 | $TiO_2$ | 50 | | metal honeycomb |
| Example 3 | Pt 0.5 | $Sb_2O_4$ 0.7 | $TiO_2$ | 5.0 | $ZrO_2$ | 50 | | ceramic honeycomb |
| Example 4 | Pt 0.5 | $MoO_3$ 1.4 | $TiO_2$ | 5.0 | $ZrO_2$ | 50 | | ceramic honeycomb |
| Example 5 | Pt 0.5 | NiO 2.0 | $TiO_2$ | 6.0 | $TiO_2$ $Al_2O_3$ | 50 20 | | ceramic honeycomb |
| Example 6 | Pt 0.5 | $V_2O_5$ 0.4 | $TiO_2$ | 6.0 | $TiO_2$ $Al_2O_3$ | 50 20 | | ceramic foam |
| Example 7 | Pt 0.5 | $Bi_2O_3$ 1.5 | $TiO_2$ | 7.0 | $TiO_2$ $ZrO_2$ | 40 10 | $Rh/Al_2O_3$ 0.1/5.0 | metal honeycomb |
| Example 8 | Pt 0.5 | $Co_3O_4$ 0.4 | $TiO_2$ | 7.0 | $TiO_2$ $ZrO_2$ | 40 10 | $Rh/Al_2O_3$ 0.1/5.0 | metal honeycomb |
| Example 9 | Pd 2.0 | CaO 0.5 | $TiO_2$ | 10.0 | $ZrO_2$ | 50 | | ceramic honeycomb |
| Example 10 | Pd 2.0 | ZnO 0.6 | $TiO_2$ | 10.0 | $ZrO_2$ | 50 | | ceramic honeycomb |
| Example 11 | Pd 2.0 | MgO 1.3 | $TiO_2$ | 10.0 | $ZrO_2$ | 50 | | ceramic honeycomb |
| Example 12 | Pd 1.5 | $MnO_2$ 2.0 | $ZrO_2$ | 5.0 | $TiO_2$ $ZrO_2$ | 10 40 | | ceramic honeycomb |
| Example 13 | Pd 1.5 | $Fe_2O_3$ 1.8 | $TiO_2$ | 5.0 | $Al_2O_3$ $ZrO_2$ | 20 40 | | ceramic honeycomb |
| Control 1 | Pt 1.0 | | $ZrO_2$ | 60 | | | | ceramic honeycomb |
| Control 2 | Pt 0.5 | $WO_3$ 2.0 | $TiO_2$ | 50 | | | | metal honeycomb |
| Control 3 | Pt 0.5 | $Sb_2O_4$ 0.7 | $TiO_2$ | 30 | $ZrO_2$ | 25 | | ceramic honeycomb |
| Control 4 | Pt 0.5 | NiO 5.0 | $TiO_2$ | 6.0 | $TiO_2$ $Al_2O_3$ | 50 20 | | ceramic honeycomb |
| Control 5 | Pd 2.0 | | | | $ZrO_2$ | 50 | | ceramic honeycomb |

Evaluation of Catalysts

The catalysts were evaluated for ability to purify diesel engine exhaust gas by the following method. In this method, a supercharge direct-injection diesel engine (4-cylinder 2800 cc) was used as a test apparatus and gas oil having a sulfur content of 0.06% by weight was used as a fuel. A sample catalyst was attached to an exhaust gas pipe from the engine mentioned above and subjected to 100 hours' durability test under the conditions of full load of the engine, i.e. 2500 rpm, and 700° C. of catalyst inlet temperature.

Then, the sample catalyst was ventilated for one hour under the conditions of 2000 rpm of engine revolution number, 3.0 kg·m of torque, and 200° C. of catalyst inlet temperature. Then, the operating conditions were changed to 2000 rpm of engine revolution number and 11.0 kg·m of torque. While the catalyst inlet temperature was kept stable at 350° C., the exhaust gas was sampled at the inlet and the outlet of the catalyst bed. The exhaust gas samples thus collected were tested for the content of minute particulars by the standard dilution tunnel method to determine the ratio of elimination of minute particulates (%).

Further, the minute particulates seized by the dilution tunnel from the samples were extracted with dichloro methane solution. The amount of SOF discharged was determined from the change of weight of the minute particulates before and after extraction and the ratio of elimination of the SOF was found.

The exhaust gas was sampled at the inlet and the outlet of the catalyst bed. The exhaust gas samples thus obtained were analyzed for sulfur dioxide, gaseous hydrocarbons, and carbon monoxide to determine the conversions (%). The results are shown in Table 2.

TABLE 2

|  | Content of minute particulates in exhaust gas | | Ratio of elimination of minute particulates (%) | Conversion of hydrocarbons (%) | Conversion of carbon monoxide (%) | Conversion of sulfur dioxide (%) | Ratio of elimination of SOF (F) |
| --- | --- | --- | --- | --- | --- | --- | --- |
|  | Inlet (mg/m3) | Outlet (mg/m3) |  |  |  |  |  |
| Example 1 | 31.2 | 45.3 | −45.2 | 87 | 100 | 28 | 86 |
| Example 2 | 30.7 | 24.2 | 21.2 | 86 | 100 | 3.0 | 81 |
| Example 3 | 31.7 | 23.3 | 26.5 | 89 | 100 | 1.5 | 87 |
| Example 4 | 31.9 | 24.6 | 22.9 | 88 | 100 | 2.3 | 82 |
| Example 5 | 30.4 | 23.7 | 22.0 | 85 | 98 | 2.1 | 80 |
| Example 6 | 29.8 | 21.8 | 26.8 | 89 | 100 | 0.9 | 84 |
| Example 7 | 30.3 | 21.6 | 28.7 | 86 | 99 | 0.3 | 85 |
| Example 8 | 30.6 | 21;3 | 30.4 | 86 | 98 | 0.4 | 90 |
| Example 9 | 28.7 | 21.0 | 26.8 | 75 | 22 | 0 | 77 |
| Example 10 | 29.5 | 21.8 | 26.1 | 73 | 20 | 0 | 75 |
| Control 1 | 31.4 | 49.7 | −58.3 | 75 | 85 | 30 | 63 |
| Control 2 | 30.8 | 47.8 | −55.2 | 73 | 82 | 28 | 60 |
| Control 3 | 31.0 | 34.2 | −10.3 | 78 | 86 | 12.3 | 65 |
| Control 4 | 29.7 | 42.1 | −41.8 | 70 | 65 | 22 | 59 |
| Control 5 | 30.2 | 34.5 | −14.2 | 62 | 25 | 12 | 55 |

What is claimed:

1. A method of purifying diesel engine exhaust gas containing sulfur and SOF which comprises passing said gas over a catalyst comprising a refractory three-dimensional structure coated with
   (A) a platinum and/or palladium-carrying first refractory inorganic oxide powder obtained by depositing platinum and/or palladium and a catalytically active oxide of at least one metal selected from the group consisting of tungsten, antimony, molybdenum, nickel, manganese, iron, bismuth, cobalt, zinc, and alkaline earth metals on (a) a first refractory inorganic oxide powder, said platinum and/or palladium being contained therein in an amount in the range of from 5% to 50% by weight, based on the amount of (a) said first refractory inorganic oxide powder and
   (B) a catalyst composition formed of (b) a second refractory inorganic oxide powder selected from the group consisting of alumina, silica, titania, zirconia, silica-alumina, alumina-zirconia, alumina-titania, silica-titania, silica-zirconia, titania-zirconia and zeolites.

2. A method of claim 1, wherein said platinum and/or palladium-carrying refractory inorganic oxide powder has a platinum and/or palladium content in the range of from 0.01 to 3 g, a catalytically active oxide content in the range of from 0.01 to 4 g, and (a) a first refractory inorganic oxide powder content in the range of from 0.01 to 15 g per liter of said refractory three-dimensional structure.

3. A method of claim 2, wherein the mixing ratio of (a) the first refractory inorganic oxide powder to (b) the second refractory inorganic oxide powder is in the range of from 0.5 to 1.

4. A method of claim 3, wherein said platinum and/or palladium-carrying refractory inorganic oxide powder has a platinum and/or palladium content in the range of from 0.1 to 2 g, a catalytically active oxide content in the range of from 0.01 to 2 g, and (a) a first refractory inorganic oxide powder content in the range of from 0.02 to 10 g per liter of said refractory three-dimensional structure.

5. A method of claim 4, wherein the amount of platinum and/or palladium is in the range of from 10 to 15% by weight based on the amount of (a) said first refractory inorganic oxide powder.

6. A method of claim 5, wherein said first and said second refractory inorganic oxide powders have a primary average particle diameter in the range from 50 to 3,000 Angstroms.

7. A method of claim 6, wherein said powders have a BET surface area in the range of from 1 to 200 m²/g.

8. A method of claim 7, wherein the amount of catalyst components A and B coated on said refractory three-dimensional structure is in the range of from 0.1 to 200 g per liter of said refractory three-dimensional structure.

9. A method of claim 8, wherein said coating having said catalyst components A and B is coated with a further coating of rhodium-carrying refractory inorganic oxide powder having 0.01 to 0.5 g of rhodium deposited on (c) a third refractory inorganic oxide powder per liter of said refractory three-dimensional structure.

10. A method of claim 9, wherein the amount of said rhodium-carrying refractory inorganic oxide powder is in the range of from 0.01 to 50 g per liter of said three-dimensional structure.

* * * * *